(12) United States Patent
Datta

(10) Patent No.: US 7,464,940 B2
(45) Date of Patent: Dec. 16, 2008

(54) HIGH TEMPERATURE SPRING SEALS

(75) Inventor: Amitava Datta, East Greenwich, RI (US)

(73) Assignee: Parker-Hannifin Corporation, Cleveland, OH (US)

(*) Notice: Subject to any disclaimer, the term of this patent is extended or adjusted under 35 U.S.C. 154(b) by 0 days.

(21) Appl. No.: 10/981,308

(22) Filed: Nov. 4, 2004

(65) Prior Publication Data

US 2005/0206097 A1 Sep. 22, 2005

Related U.S. Application Data

(60) Provisional application No. 60/517,197, filed on Nov. 4, 2003.

(51) Int. Cl.
F16J 15/00 (2006.01)
F16J 15/02 (2006.01)
(52) U.S. Cl. ..................... 277/555; 277/647
(58) Field of Classification Search ......... 277/471–472, 277/545, 553, 555, 581, 621, 438, 530, 567, 277/647
See application file for complete search history.

(56) References Cited

U.S. PATENT DOCUMENTS

| | | | | |
|---|---|---|---|---|
| 3,106,404 A | * | 10/1963 | Mongitore | 277/472 |
| 3,524,636 A | | 8/1970 | Copley et al. | |
| 3,973,952 A | * | 8/1976 | Bieber et al. | 420/443 |
| 4,114,905 A | * | 9/1978 | Mercier | 277/645 |
| 4,508,356 A | * | 4/1985 | Janian | 277/555 |
| 4,585,239 A | * | 4/1986 | Nicholson | 277/555 |
| 4,946,174 A | * | 8/1990 | Usui | 277/645 |
| 5,630,591 A | * | 5/1997 | Drijver et al. | 277/553 |
| 5,799,953 A | * | 9/1998 | Henderson | 277/554 |
| 2004/0201180 A1 | * | 10/2004 | Shah et al. | 277/592 |

FOREIGN PATENT DOCUMENTS

| | | |
|---|---|---|
| GB | 2 259 119 | 3/1993 |
| GB | 2 378 486 | 2/2003 |

OTHER PUBLICATIONS

Advanced Gas Turbine Systems Research, Technical Quarterly Progress Reort, Jul. 2001-Sep. 2007, South Carolina Institute for Energy Studies, All Pages.*

* cited by examiner

Primary Examiner—Vishal Patel
(74) Attorney, Agent, or Firm—BainwoodHuang

(57) ABSTRACT

A composite seal for sealing in high temperature applications includes an inner spring for controlling the sealing load or the spring rate, and an outer jacket for providing a sealing surface. In one embodiment, the inner spring, which be made from cast blade alloys, includes a plurality of flexible fingers which are inclined with respect to a longitudinal axis of the outer jacket having a continuous outer sealing surface. The spring rate of the jacket is preferably at least about 50% less than the spring rate of the spring in order to achieve desired sealing. In one embodiment, one or more of the flexible fingers a single crystal construction and are supported by a holding ring. The axis of the finger may preferably be positioned parallel to a softer crystallographic direction of the blade alloy of the finger.

30 Claims, 13 Drawing Sheets

HIGH TEMPERATURE SPRING SEALS

CROSS REFERENCES TO RELATED APPLICATIONS

The present application claims the benefit of U.S. Provisional Application No. 60/517,197, filed Nov. 4, 2003. The entire contents of the above application is incorporated herein by reference in entirety.

TECHNICAL FIELD

The invention relates generally to seals and, more specifically, to seals including a spring element for sealing fluid flow in high temperature applications.

BACKGROUND

High temperature structural static seals are used in gas turbine engines and other equipment where high temperature fluids need to be sealed. These seals are traditionally made from cold formable superalloys with superior strength characteristics at elevated temperatures. Conventional seals typically are made from superalloy sheet stock and can have different shaped cross sections. For example, some conventional cross-sections include the C (FIG. 1A), U (FIG. 1B) and E shapes (FIG. 1C), among other annular seals. These conventional annular seal rings are preferably installed between flanges, for example $F_1$, $F_2$ (FIG. 2), in a compressed condition.

The compression stress and the fluid pressure acting on these types of conventional annular seals provide sufficient sealing force to prevent the high pressure fluid from leaking through the interfaces where the seal and the flanges meet. At temperatures less than about 1300° F., as the flanges move back and forth, the elastic spring back of the seal cross-section maintains the sealing contact with the flange, as best illustrated in FIG. 3. However, at high temperatures of about >1300° F. conventional seals made of cold formable superalloys, such as alloy 718 Waspaloy and the like, have been found to stress relax because of coarsening and dissolution of the strengthening phase γ'. At high temperatures, these seals under compression deform permanently to a compressed state, and lose the ability of elastic spring back and sealing contact with the flanges as they move away during the operating cycle of the engine, thus creating a gap, "g" between the seal and the flange. This creates a leak path through which the pressurized fluids can flow, as illustrated schematically in FIG. 3. The spring rate of conventional seals is controlled by the thickness and shape of seal cross-section as well as the yield strength, and elastic modulus of the cold formable alloys from which the seals are made.

In order to avoid permanent aforementioned failure of seal performance resulting from exposures at high temperatures, generally of about >1300° F. or so, it is known to keep the temperature of these seals from reaching such elevations. One manner in which conventional seals are cooled is by using bleed air from compressors of gas turbine engines. Although generally effective, the use of such bleed air is expensive and could be otherwise used for generating thrust or power. The use of cooling air, therefore, adversely affects the efficiency of gas turbine engines. A need exists for cost-effective high temperature structural seals which can maintain their sealing contacts at high temperatures of about >1300° F. without the need of cooling air.

Similarly, a high temperature fastening device, using its spring action and holding two components with widely different thermal expansion coefficients, such as metallic and ceramic components, can lose its fastening capability at high temperatures. For example, lightly loaded annular spring devices are necessary to attach a ceramic liner to a metallic casing of a combustor as shown in FIGS. 4A-4B. The ceramic is not rigidly fastened to the metallic casing using a bolted design because the bolt stresses generated by the differential thermal expansion of the metallic casing and ceramic liner can lead to failure of the brittle ceramic liner. Thus, a need also exists for a low load spring device which can operate at extremely high temperatures of about >1300° F., up to about 1800° F. These applications are generally in oxidizing environments and any such spring devices should also posses oxidation resistance.

SUMMARY

In accordance with the present invention, there is provided a seal for sealing in high temperature applications including an inner spring for controlling the sealing load or the spring rate, and an outer jacket for providing a sealing surface with one or more movable parts. The outer jacket is moveable by the inner spring in order to maintain a seal to prevent high pressure fluid from leaking through the interfaces where the seal and the flanges meet, particularly during high temperature applications. The spring member preferably has a spring rate that is greater than the spring rate of the jacket such that expansion of the spring member into contact with the jacket causes corresponding expansion of the jacket to maintain sealing between the outer surface of the jacket and the one or more movable parts. In one embodiment, the inner spring includes a plurality of flexible fingers, which are inclined with respect to a longitudinal axis of the outer jacket having a continuous outer sealing surface. A transition ring may be provided between an inner surface of the jacket and the top sections of the one or more flexible fingers. In another embodiment, the inner spring is tubular including a plurality of inclined slots. In either embodiment, the spring may preferably be made from a cast blade alloy that maintains its spring back characteristics at high temperatures of about 1300° F. and greater. The jacket may be made from a less expensive, oxidation resistant cold formable sheet metal.

BRIEF DESCRIPTION OF THE DRAWINGS

It should be understood that the drawings are provided for the purpose of illustration only and are not intended to define the limits of the invention. The foregoing and other objects and advantages of the embodiments described herein will become apparent with reference to the following detailed description when taken in conjunction with the accompanying drawings in which.

DETAILED DESCRIPTION OF THE INVENTION

Figure 1A:
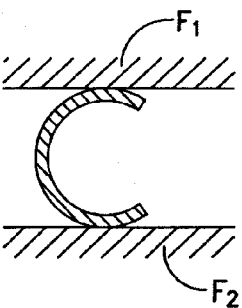
FIG. 1A is a cross-sectional view of a prior art "C" type shape seal ring compressed between flanges.

Referring now to FIGS. 5-13, a seal 10 is disclosed which can be used as a seal in high temperature applications, for example in gas turbine engines operating at about 1300° F. and greater, and for use in other equipment where high temperature fluids need to be sealed. As used herein, the term "high temperature" refers to applications which may operate, at least part of the time, at temperatures of about 1300° F. and above. As also used herein, the term "fluid" refers to all forms of fluid, including gasses and liquids. "Spring rate" is defined herein as the amount of force needed to compress a spring, or the like, a certain height, as is conventional. A first member having a lower spring rate than a second member means that less of a force is needed to compress the first member a certain distance as compared to the second member for the same distance.

The high temperature seal 10 according to the present embodiment preferably includes a spring member 14 which controls the sealing load or the spring rate and an outer jacket 12 which provides a sealing interface with the component's parts, for example flanges 15a, 15b. The outer jacket is moveable by the inner spring in order to maintain a seal to prevent high pressure fluid from leaking through the interface where the jacket and the flanges meet, particularly during high temperature applications. As best shown in FIGS. 7-11, the spring member 14 preferably includes a one or more flexible members, for example flexible fingers 16, which are inclined with respect to a longitudinal axis "L" of the outer jacket 12. By controlling the number of fingers per unit length, the width, the angle and the thickness (or depth) of the fingers, the overall spring rate of the seal can be selectively adjusted. The design can also be optimized to minimize stress and the plastic zone in the fingers at operating temperatures so that the majority of the spring deflection is in the elastic range and the device maintains its spring back characteristics, as described in greater detail below.

Figure 1B:
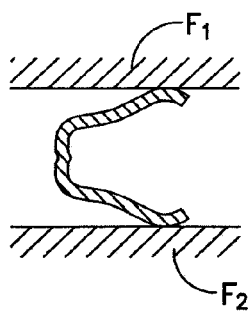
FIG. 1B is a cross-sectional view of a prior art "U" type shape seal ring compressed between flanges.
Figure 1C:
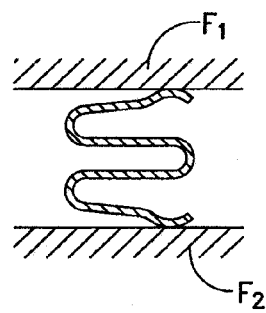
FIG. 1C is a cross-sectional view of a prior art "E" type shape seal ring compressed between flanges.
Figure 2:
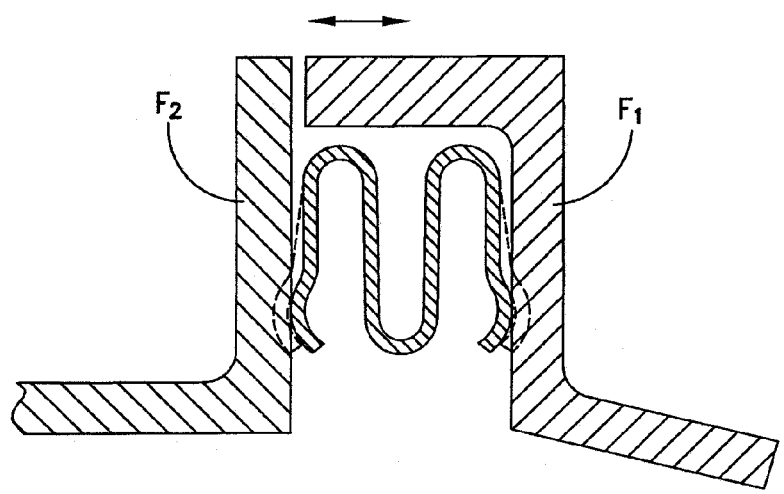
FIG. 2 is a schematic, cross-sectional view of the prior art seal of FIG. 1C during use.
Figure 3:
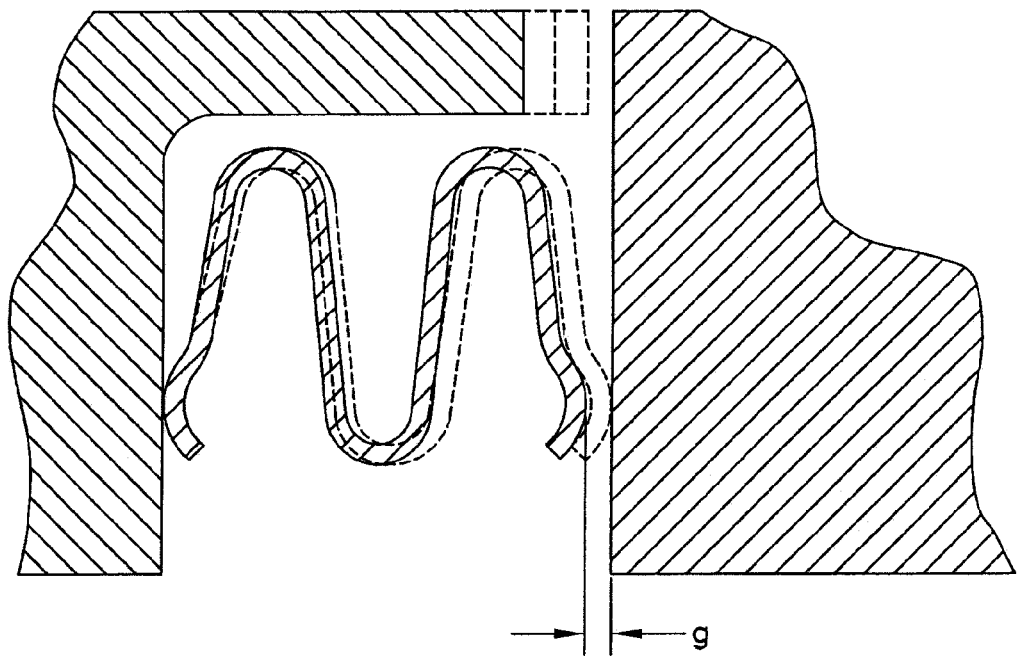
FIG. 3 is a schematic, cross-sectional view of FIG. 2 illustrating stress relaxation of the prior art seal ring at elevated temperatures.
Figure 6:
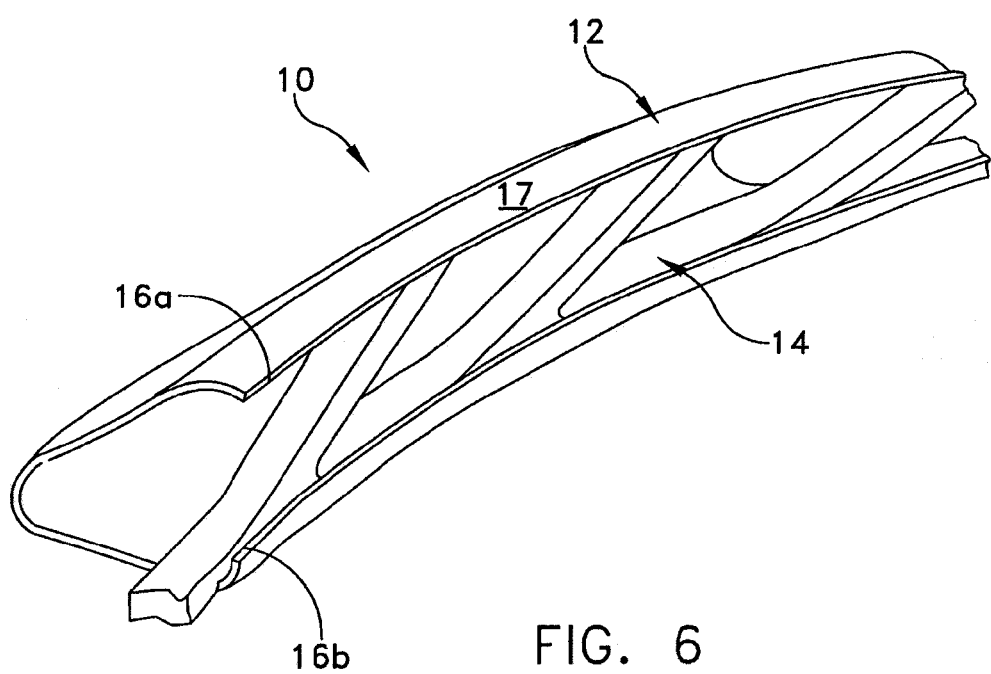
FIG. 6 is an enlarged view of the high temperature seal of FIG. 5.

As best shown in FIG. 6, the spring member 14 is preferably disposed within the sealing jacket 12 which includes a continuous outer sealing surface 17 for forming a sealing interface with flanges 15a, 15b. The jacket 12 may include a first and a second end 16a, 16b which may overlap, or which may disposed at a distance from each other so as to form a gap that provides access to the inner spring member 14. Thus, the jacket may have a generally U-shaped cross-section as shown in FIG. 6, a generally C-shaped cross-section, or in the case of overlapping, an O-shaped cross-section. The jacket may be made from any known oxidation resistant cold formable sheet metal sheet stock, for example Haynes 214 manufactured by Haynes International. Because the present embodiment includes an inner spring, the jacket 12 does not need to provide the sealing force by acting as a spring as with prior art designs illustrated in FIGS. 1A-1C. Instead, the spring member 14 provides the sealing force sufficient to maintain the jacket in sealing contact with the flanges 15a, 15b during movement, even at high temperatures.

Figure 7:
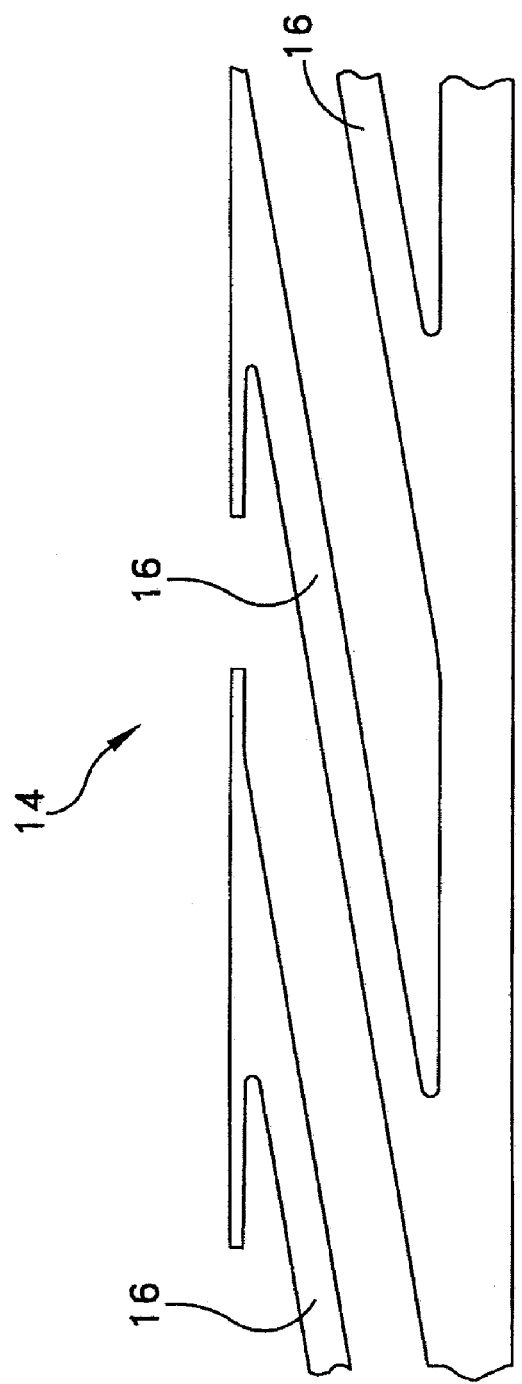
FIG. 7 is a side view of the spring member of FIG. 5.
Figure 8:
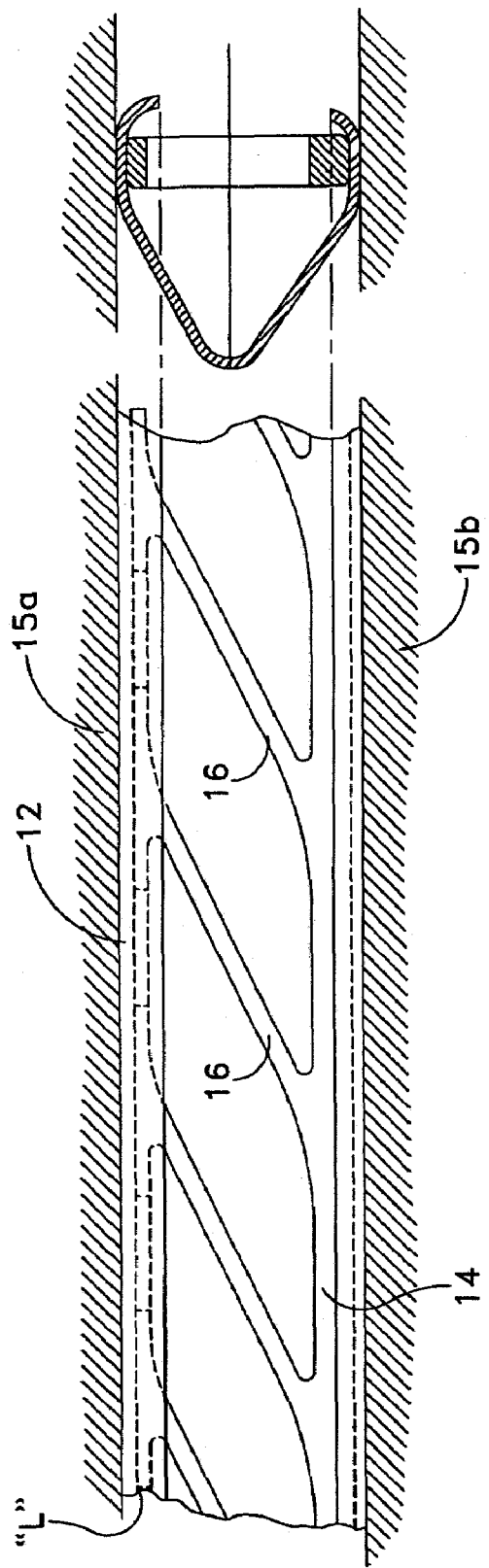
FIG. 8 is a side view in partial cross section of the high temperature seal of FIG. 5.

In order that the spring member 14 can function at high temperatures, it is preferably made of a cast blade alloy, for example, MARM 247, CMSX3, CMSX4 manufactured by Howmet Castings, or the like, which are used for high temperature turbine blades. The cast blade alloys have superior high temperature strength characteristics compared to formable superalloys such as 718, Waspaloy manufactured by Special Metals, and other such superalloys utilized in prior art seals. The strengthening γ' phases in cast blade alloys are also very stable up to about 1800° F. Typical strength characteristics of cast blade alloys and cold formable superalloys are shown in Table 1. As illustrated in Table 1, the yield strength values of the cast blade alloys (MARM 247, CMSX3 and CMSX4) are much higher than those of cold formable superalloys such as Inco 718, Waspaloy and the like. Although very stable at high temperatures, such cast blade alloys cannot be hot, or cold rolled to a sheet stock. In accordance with the present embodiment, springs may be fabricated from such cast blade alloys by casting and machining shapes as shown in FIG. 7 and FIG. 8, including the plurality of inclined fingers 16.

TABLE 1

| Alloy Type | Alloy | Temperature (° F.) | Yield Strength (ksi) | % Elongation |
|---|---|---|---|---|
| Blade Alloy, Polycrystal, equalized (bar) | MARM 247 | 1200° F. | 114 | 11 |
| Blade Alloy, Single crystal (bar) | CMSX3 | 1400° F. | 163 | 11 |
| Blade Alloy, Single crystal (Bar) | CMSX4 | 1600° F. | 122 | 18 |
| Cold Formable Superalloy (sheet) | Alloy 718 | 1475° F. | 104 | 8 |
| Cold Formable Superalloy (sheet) | Waspaloy | 1600° F. | 75 | 35 |
| Cold Formable Superalloy (sheet) | Rene 41 | 1600° F. | 80 | 20 |

As detailed above, the composite seal 10 includes spring member 14 which controls the sealing load or the spring rate and an outer jacket 12 which provides a sealing surface. To achieve this, the spring member 14 must be able to provide a force sufficient to move the outer jacket 12 with the movement of flanges 15a, 15b. Thus, the spring rate of the jacket should be appreciably less than the spring rate of the spring. In particular, it is preferred that the spring rate of the jacket be at least about 50% less than the spring rate of the spring to facilitate movement of the jacket by the spring. In the present embodiment, the spring rate is calculated as the force per unit circumferential length to compress the seal height (FIG. 9), or the distance between the sealing surfaces of the flanges. For example, a spring rate of 15 lbs/inch per mil means a force of 15 lbs. per inch of seal circumference is necessary to compress the seal height by 0.001".

In order to minimize the spring rate of the jacket 12 the thickness, "th", of the jacket is preferably very thin. For example, the thickness of the jacket 12 may preferably be less than about 0.006" (i.e. 6 mils) in the present embodiment. At high temperatures, the composite structure of the spring member 14 is expected to maintain its elastic spring characteristics because of the superior high temperature strength characteristics of the blade alloy spring even when the weaker jacket deforms plastically (i.e. permanently). So, even if the jacket 12 deforms plastically, the spring member 14 will be able to maintain the jacket in sealing engagement with the flanges as they move.

Figure 9:
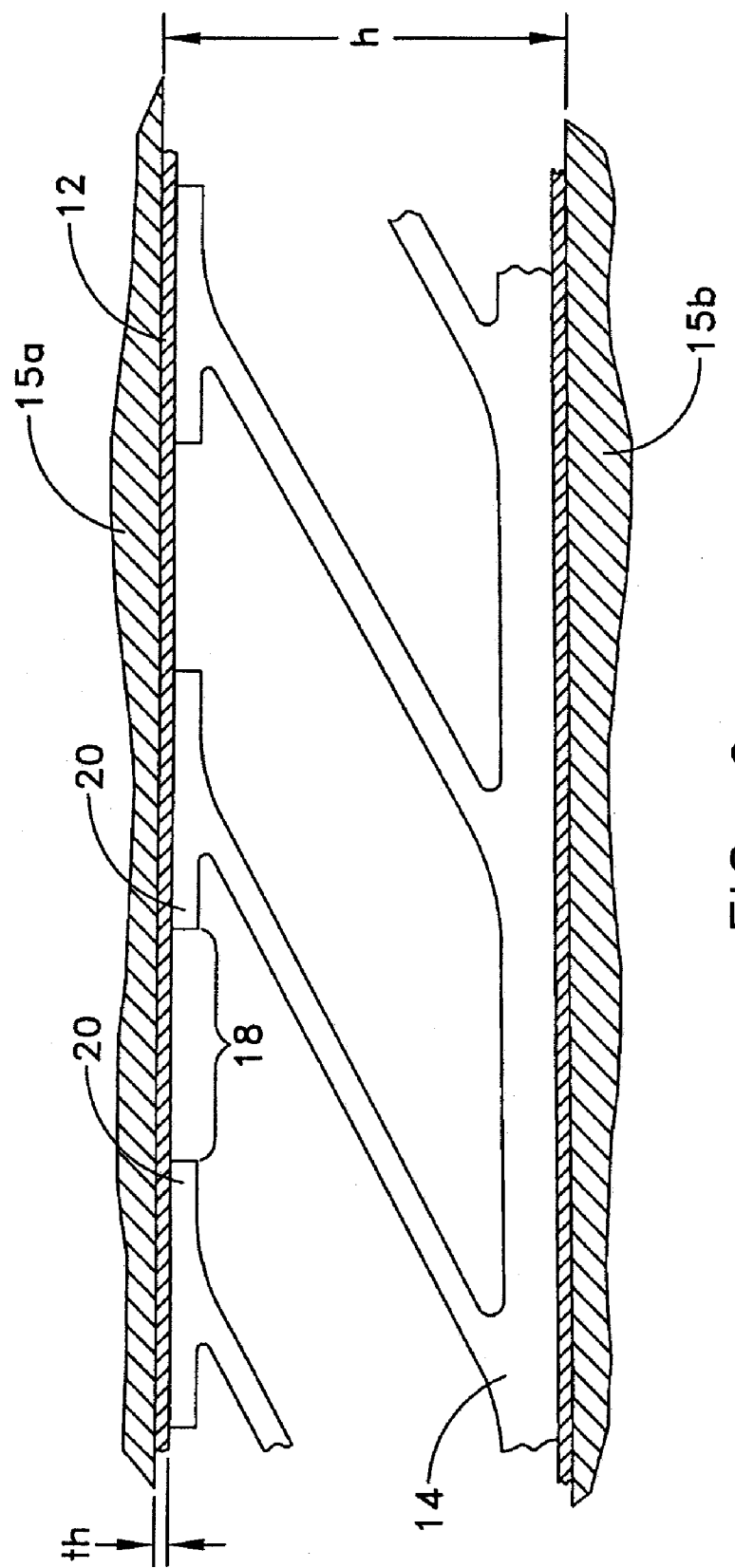
FIG. 9 is an enlarged view of the high temperature seal of FIG. 8.
Figure 10:
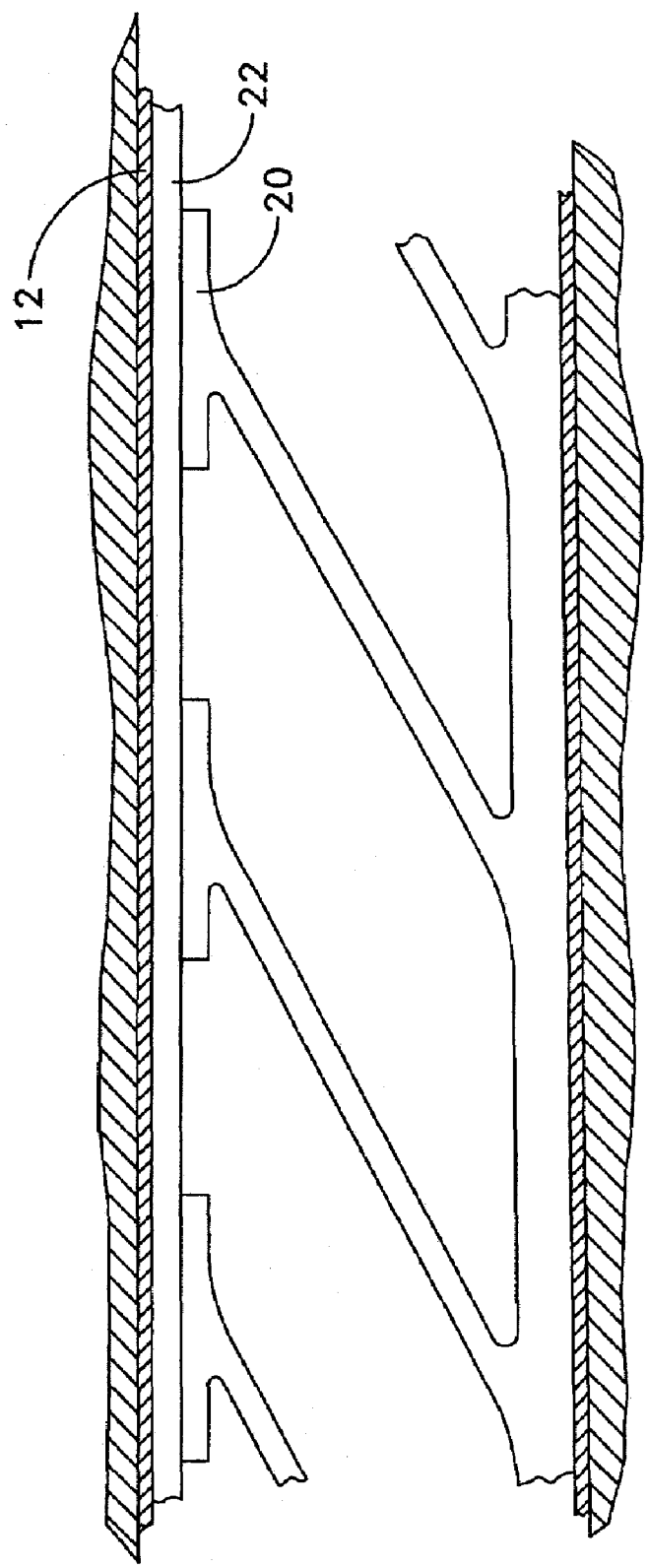
FIG. 10 is an enlarged, side view in partial cross-section of the spring member of FIG. 5 including a transition ring.

As shown in FIG. 9, gaps 18 are preferably formed between the substantially flat, planar top sections 20 of adjacent, inclined fingers. The gaps 18 between adjacent top sections are provided to lower the spring rate and stresses in the fingers as they are compressed between the flanges during use. However, this discontinuity between individual fingers can lead to non-uniform sealing loads along the seal circumference. As a result, higher sealing loads can be expected at the top sections 20 of the finger springs 16 pushing the jacket 12 against the flange and somewhat lower sealing loads at the gaps between the fingers. This can potentially lead to leak rates through the gaps. In order to curtail non-uniform sealing loads, a somewhat rigid transition ring 22 may preferably disposed between the jacket 12 and the discontinuous top sections 20, as shown in FIG. 10. For example, the transition ring may have a thickness which is at least five times thicker than the jacket (if made of the same or similar material) in order to impart sufficient rigidity to the ring. By incorporating a separate transition ring 22, the sealing load acting on the relatively thin sealing jacket 12 is made uniform around the seal circumference, while maintaining the low load or spring rate characteristics of individual finger springs.

Figure 11:
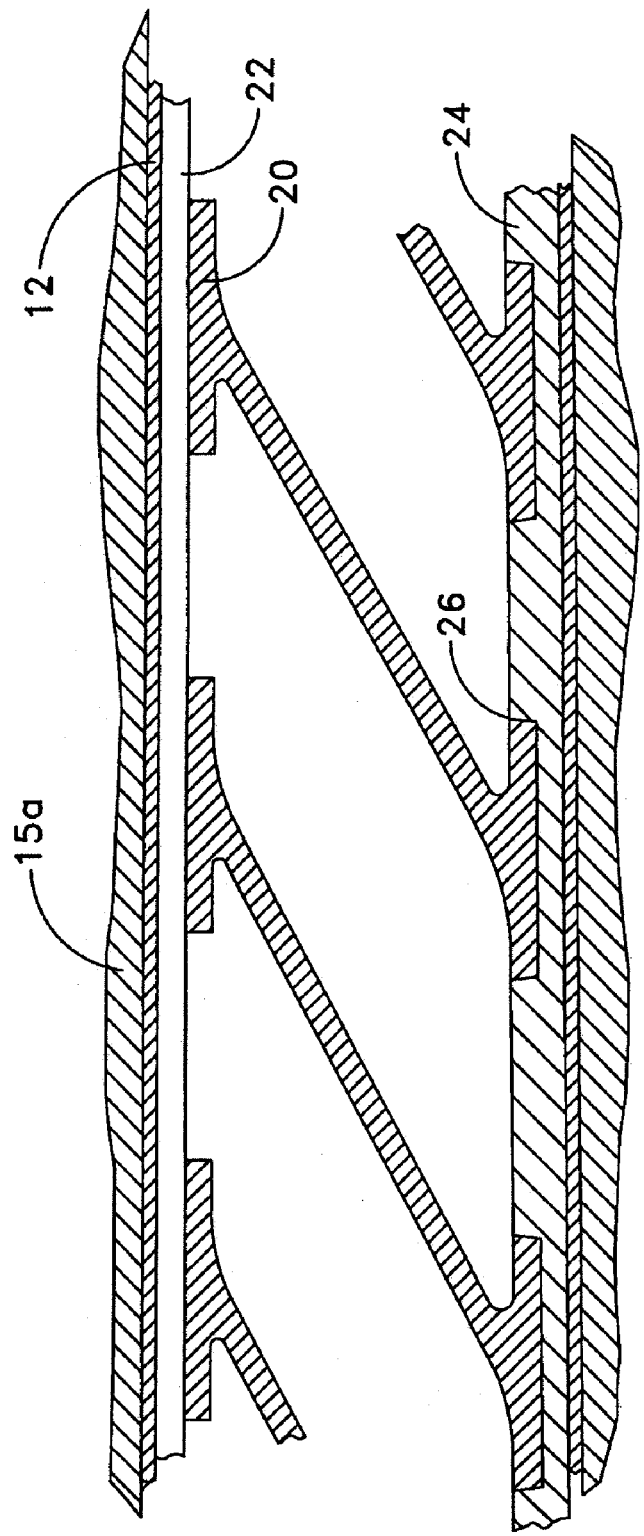
FIG. 11 is an enlarged, side view in partial cross-section of the spring member of FIG. 5 including a transition and holding ring.

The finger springs as shown in FIGS. 6-10 can be precision machined from a cast ring. In addition, the resistance to stress relaxation caused by high temperature creep deformation can be enhanced by removing the grain boundaries or using a single crystal structure. One suitable technique for machining the springs is to use electro-discharge machining (EDM), as known to those of skill in the art. However, if the entire structure is made from a cast single crystal ring and machined using EDM, it becomes very expensive to manufacture. In order to make the present embodiment more affordable, the spring is preferably fabricated from single crystal blade alloy fingers which are supported by a base, for example a holding ring 24 made of commonly used wrought superalloys, for example Inco 718, Waspaloy, Rene 41 and the like (FIG. 11). The highest creep strength single crystal structure is preferably used for the fingers which experience the highest stress during operation. The balance of the spring structure experiencing much lower stresses can be made from the less expensive, easily machinable superalloys. The single crystal fingers can be cast to the near-net shape and, with minor machining of the base, they can be secured to tight fitting grooves 26 machined on the superalloy holding ring 24. The single crystal fingers can be attached to the holding ring by commonly used joining techniques such as brazing or welding techniques, as would be known to those of skill in the art. In this manner, large or small diameter seal rings can be fabricated cost-effectively using cast, near-net shape single crystal blade alloy finger springs attached to commonly used polycrystalline holding rings machined from cast or forged blank rings.

Figure 12A:
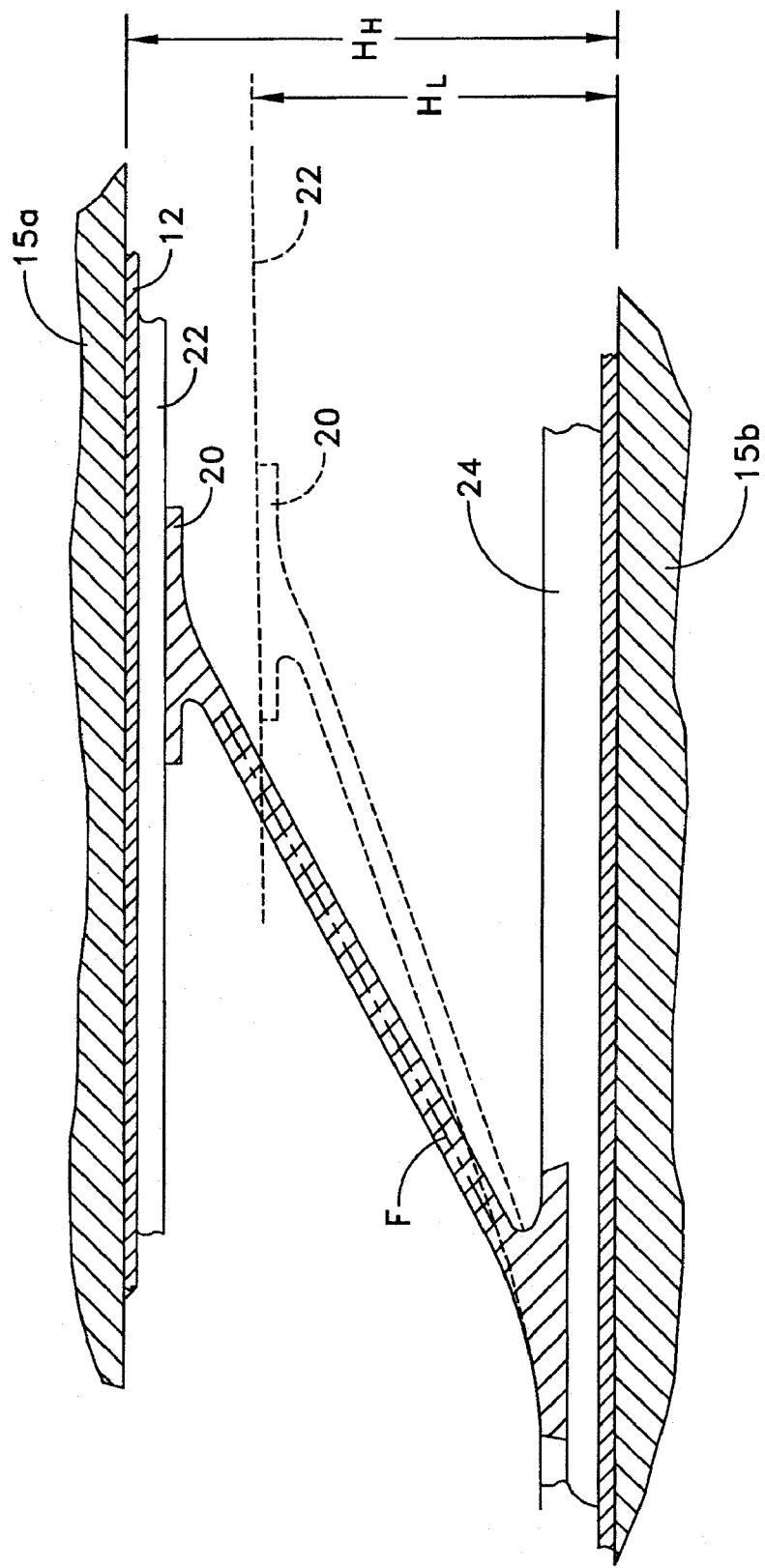
FIG. 12A is an enlarged cross-sectional side view of a single finger of the spring member of FIG. 11 illustrating deformtion during flange movement.
Figure 12B:
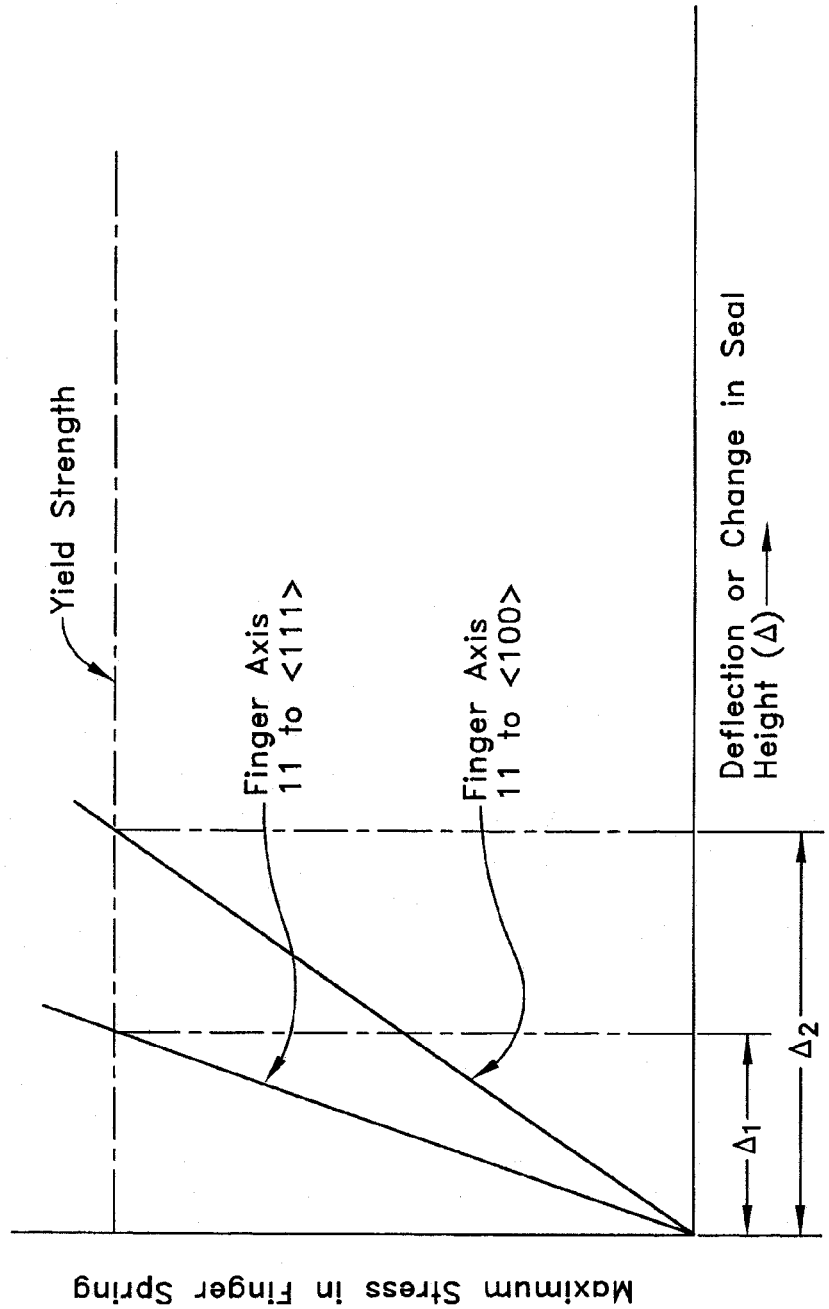
FIG. 12B is a chart showing change in seal height vs. maximum stress in the finger spring.

By changing the crystallographic orientation of the spring, the flexibility of the single crystal springs can, likewise, be changed. The graph of FIG. 12B illustrates two different seal height changes, $\Delta_1$ and $\Delta_2$, corresponding to cases where spring axis is parallel to <111> and <100> crystallographic directions of the blade alloy, in this example a nickel matrix. For nickel, the elastic modulus along <111> or $E_{111}$ is about 2.2 times that along <100> or $E_{100}$. Thus, <100> is known as the "soft" crystallographic direction and <111> is known as the "hard" crystallographic direction. For example, if the axis of the finger, "F" is parallel to a softer crystallographic direction of the nickel matrix, as shown in FIGS. 12A-12B, the deflection of the seal height can remain elastic through a greater degree of flange movement than if the finger axis is parallel to the harder crystallographic direction. As the deflection remains elastic, the structural seal is able to follow the flanges from the completely compressed condition (or lowest seal height, $H_L$) to the fully retracted condition (or highest seal height, $H_H$), thus maintaining sealing integrity and not allowing for a leak path for the pressurized fluid. Thus, the formation of a gap between the flange and the seal is avoided even after the seal is exposed to the high temperatures of about >1300° F.

As will be appreciated, the maximum bending stress in the fingers is expected to increase with defection about 2.2 times faster when the finger axis is parallel to <111> compared to when it is parallel to <100>, as shown in FIG. 12B. If $\Delta_1$ is the maximum seal height deflection when maximum stress reaches yield strength for the <111> orientation of the finger axis and $\Delta_2$ is that for the <100> orientation, $\Delta_1$ and $\Delta_2$ represent maximum amounts of seal compression where compression is completely elastic and fully recoverable. It is desirable to keep the maximum stress less than the yield strength at the operating temperature so that the seal deflection remains in the elastic regime and the seal can track the flange movement and maintain sealing integrity. Thus, it is preferably to orient, i.e. align, the finger axis parallel to the "soft" direction so that the elastic range of the seal compression with the flange movement can be more than doubled (about 2.2 times for Ni).

The present case illustrated only one illustrative embodiment of the inclined spring fingers. However, other versions of inclined fingers can be designed based on the available geometric envelopes and application needs. Provided, however, that the highest strength single crystal structures utilized are for the finger springs which experience the highest stresses. The remaining structures can be fabricated from easily machinable lower-cost superalloys. By using the single crystal structure only in the finger springs, they can be cost effectively investment cast to the near-net shape, thereby minimizing the fabrication cost. Also, the spring finger axis can be selected to maximize the elastic deflection range of the seal height.

Figure 13:
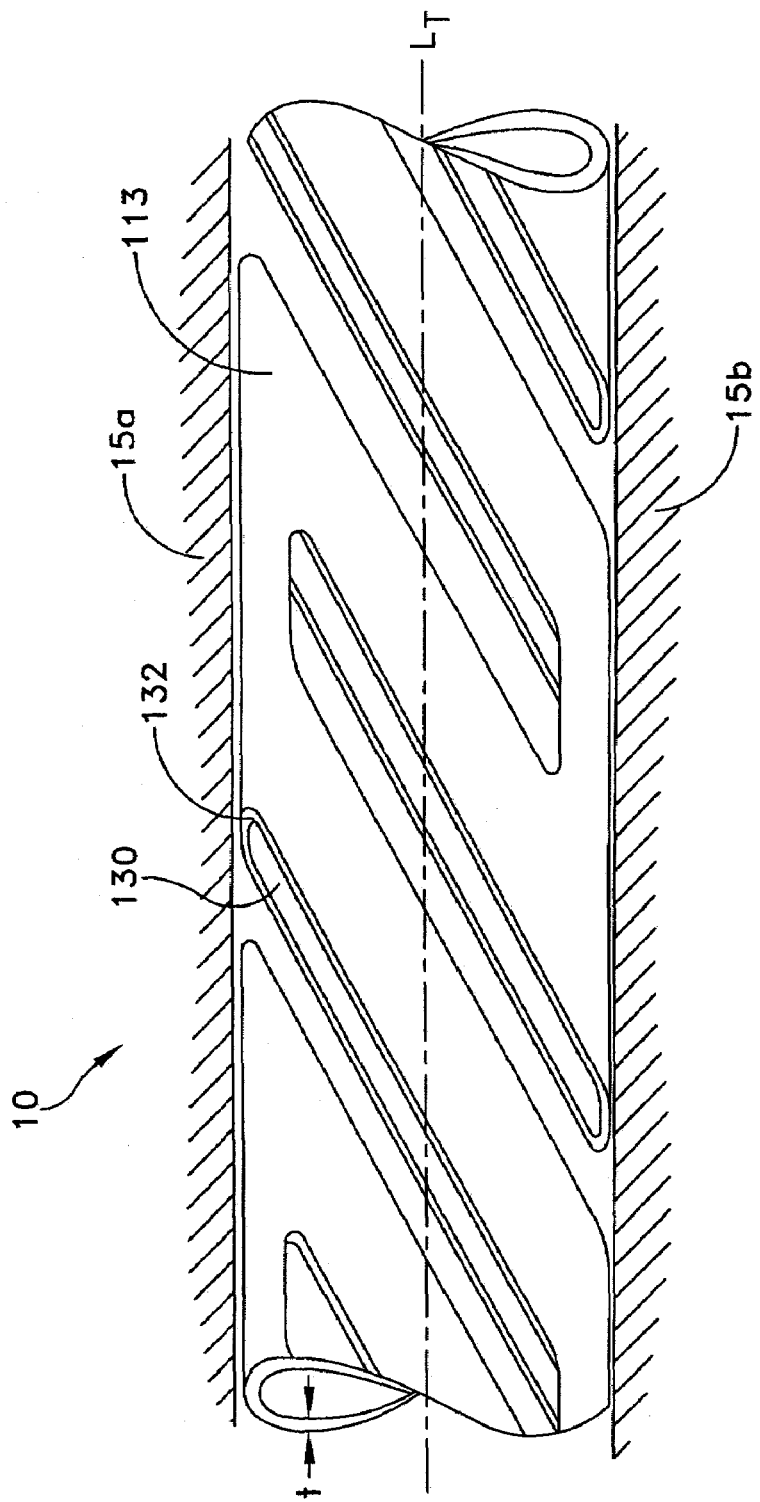
FIG. 13 is a side, partial cross-sectional view of an alternate spring member.

FIG. 13 illustrates an alternative embodiment in which the spring 110 comprises an outer sleeve or tube 113 made from a hollow tube of circular or elliptical cross-section with inclined slots 130, with the open ends 132 of the adjacent slots preferably disposed diametrically opposite to each other. The thickness of the tube, "t", number of slots per unit length, the width of the slots, and angle of the slots with respect to the longitudinal axis, "$L_T$" of the tube can be optimized to minimize stress and plastic zone, and maximize elastic spring back, depending upon the particular application. In this manner, the majority of the deflection of the tube is kept in the elastic regime and the spring maintains its spring back capability at higher temperatures.

Figure 4A:
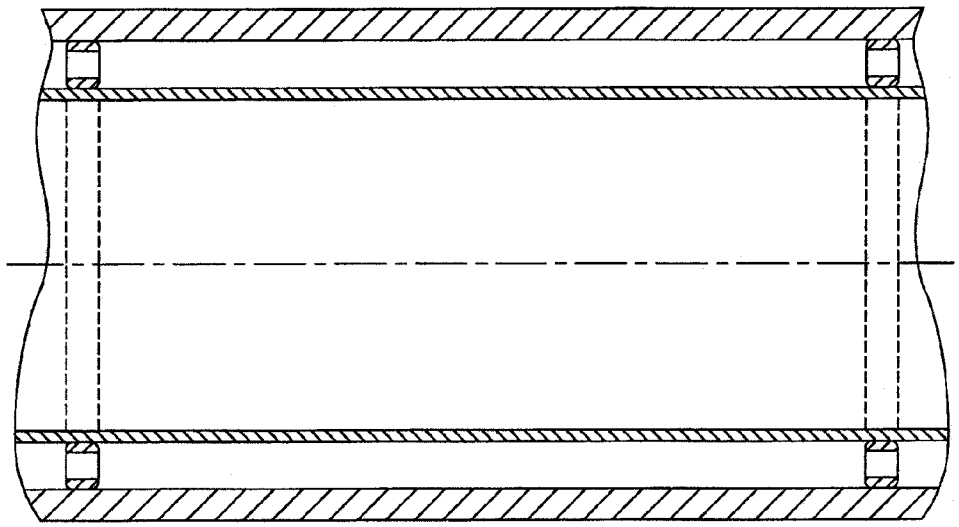
FIG. 4A is a schematic illustration of a prior art high temperature annular spring fastener.
Figure 4B:
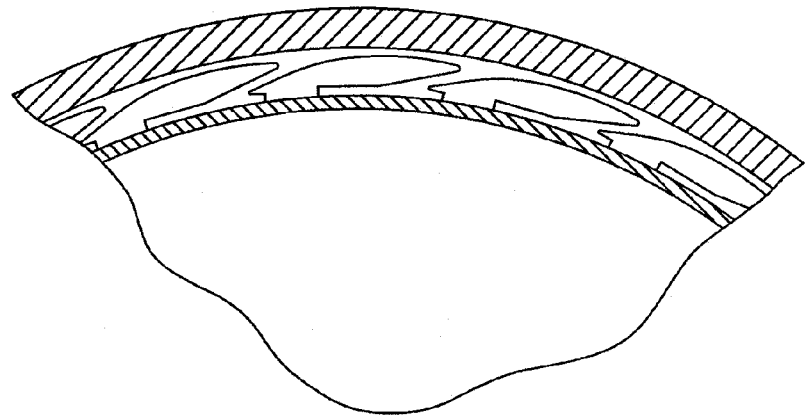
FIG. 4B is an enlarged, cross sectional view of the prior art annular spring fastener of FIG. 4A.
Figure 5:
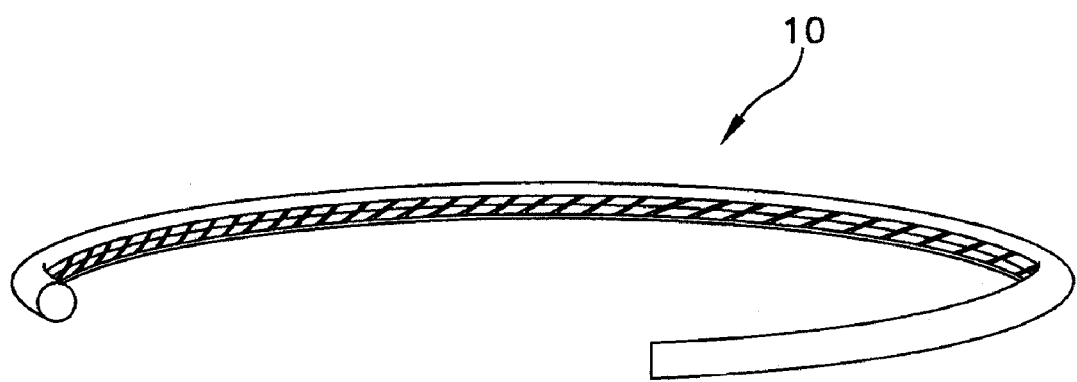
FIG. 5 is a perspective view of a seal for high temperature applications having an inner spring member.

For the embodiment of either FIG. 7 or FIG. 13, the springs are preferably incorporated in a high temperature seal design where the springs are enclosed in an oxidation resistant cold formable sheet metal jacket which provides a continuous sealing surface. The springs can also be used as high temperature fasteners to hold components with widely different thermal expansion coefficients such as metallic and ceramic components as shown in FIG. 4, illustrating a ceramic combustor liner held in a metal casing. It will also be appreciated that the springs as illustrated in this disclosure can be used for any spring application at temperatures greater than about 1300° F. If utilized as a fastener or for other applications, the outer sheet jacket may, or may not be utilized, as desired.

It will be understood that various modifications may be made to the embodiments disclosed herein. For example the springs of the illustrative embodiments are not disclosed as being formed from ceramics because of ceramics general lack of toughness and propensity of brittle fracture. However, novel tougher ceramics or cermets having superior toughness, such as transformation toughened zirconia could be utilized for extremely high temperatures, above >2000° F. In addition, the geometric shape of the spring and jacket may be modified, as may the dimensions, as would be known to those of skill in the art. Therefore, the above description should not be construed as limiting, but merely as exemplifications of a preferred embodiment. Those skilled in the art will envision other modifications within the scope, spirit and intent of the invention.

What is claimed is:

1. A seal for use in high temperature applications for sealing against a first and a second part, the seal comprising:
   a jacket including an outer sealing surface constructed and arranged to form a sealing interface with the first part and the second part;
   a spring member disposed within the outer jacket and including plurality of flexible members, the plurality of flexible members being moveable between a compressed position and an expanded position as one or both of the first and second parts move, the spring member having a spring rate that is greater than the spring rate of the jacket such that expansion of the spring member into contact with the jacket causes corresponding expansion of the jacket into sealing engagement with the first and second parts;
   wherein the spring member comprises a cast blade alloy effective to cause the plurality of flexible members of the spring member to resist stress relaxation when the spring member is exposed to a temperature greater than about 1300° F., the stress relaxation positioning the plurality of flexible members, relative to the first and second parts, from the expanded position to a compressed position;
   each of the plurality of flexible members comprising one or more flexible fingers, each of the one or more flexible fingers having a longitudinal axis that extends along a circumference of the spring member;
   the spring member having a base, the one or more flexible fingers extend from the base;
   the longitudinal axis of each of the one or more flexible fingers disposed at an angle with respect to the circumference of the spring member between a first jacket portion of the jacket and a second jacket portion of the jacket, the first jacket portion opposing the second jacket portion, the at least one finger having a first end disposed in proximity to the first jacket portion and a second end of the at least one finger and said base disposed in proximity to the second jacket portion, the first end opposing the second end, the longitudinal axis of the one or more flexible fingers defining a first acute angle relative to the first jacket portion and the longitudinal axis of the one or more flexible fingers defining a second acute angle relative to the second jacket portion, the first acute angle being substantially equal to the second acute angle.

2. The seal of claim 1, further comprising a transition ring supported between an inner surface of the jacket and top sections of the one or more flexible fingers.

3. The seal of claim 1, wherein the one or more flexible fingers are made from a single crystal blade alloy having a softer crystallographic direction and a harder crystallographic direction.

4. The seal of claim 3, wherein an axis disposed through the length of the one or more flexible fingers is parallel to the softer crystallographic direction of the blade alloy.

5. The seal of claim 3, wherein the single crystal blade alloy fingers are supported within slots disposed in said base.

6. The seal of claim 5, wherein the base is a holding ring made of wrought superalloys.

7. The seal of claim 1, wherein the plurality of flexible members comprises a hollow tube with inclined slots.

8. The seal of claim 1, wherein the outer sealing surface of the jacket is continuous.

9. The seal of claim 1, wherein the jacket is made from an oxidation resistant cold formable sheet metal.

10. The seal of claim 1, wherein the spring rate of the jacket is at least about 50% less than the spring rate of the spring so as to facilitate movement of the jacket by the spring.

11. The seal of claim 1, wherein the one or more flexible fingers comprise a plurality of flexible fingers, each of the plurality of flexible fingers include a generally planar top section, and wherein top sections of adjacent flexible fingers are spaced from each other so as to form a gap therebetween.

12. The seal of claim 1, wherein the cast blade alloy comprises a single crystal structure.

13. The seal of claim 1, wherein the cast blade alloy comprises a polycrystal structure.

14. The seal of claim 1, wherein the cast blade alloy comprises a boundary-free grain structure, the boundary-free grain structure effective to cause the flexible members of the spring member to resist stress relaxation when the spring member is exposed to a temperature greater than about 1300° F.

15. The seal of claim 1, wherein the spring member is disposed within a cavity defined by the jacket, the spring member defining a height of about 0.25 inches.

16. The seal of claim 15, wherein the one or more flexible members defines a thickness of about 0.04 inches.

17. The seal of claim 1, wherein the first acute angle is equal to approximately 10 degrees and the second acute angle is equal to approximately 10 degrees.

18. A seal for use in high temperature applications for sealing against a first and a second part, the seal comprising:
   a jacket including an outer sealing surface constructed and arranged to form a continuous sealing interface with the first part and the second part and a longitudinal axis, the jacket made from an oxidation resistant cold formable metal and including a first end and a second end that are movable toward each other as the jacket is compressed and away from each other as the jacket expands;
   a spring member disposed within the outer jacket and including plurality of flexible members, the plurality of flexible members being moveable between a compressed position and an expanded position as one or both of the first and second parts move, the spring member being made from a cast blade metal and having a spring rate that is greater than the spring rate of the jacket such that expansion of the spring member into contact with the jacket causes corresponding expansion of the jacket into sealing engagement with the first and second parts;

wherein the spring member comprises a cast blade alloy effective to cause the plurality of flexible members of the spring member to resist stress relaxation when the spring member is exposed to a temperature greater than about 1300° F., the stress relaxation positioning the plurality of flexible members, relative to the first and second parts, from the expanded position to a compressed position;

longitudinal axis of each of the plurality of flexible members comprising one or more flexible fingers, each of the one or more flexible fingers having a longitudinal axis that extends along a circumference of the spring member;

the spring member having a base, the one or more flexible fingers extend from the base;

the one or more flexible fingers disposed at an angle with respect to the circumference of the spring member between a first jacket portion of the jacket and a second jacket portion of the jacket, the first jacket portion opposing the second jacket portion, the at least one finger having a first end disposed in proximity to the first jacket portion and a second end and said base disposed in proximity to the second jacket portion, the first end opposing the second end, the longitudinal axis of the one or more flexible fingers defining a first acute angle relative to the first jacket portion and the longitudinal axis of the one or more flexible fingers defining a second acute angle relative to the second jacket portion, the first acute angle being substantially equal to the second acute angle.

19. The seal of claim 18, further comprising a transition ring supported between an inner surface of the jacket and top sections of the one or more flexible fingers.

20. The seal of claim 18, wherein the one or more flexible fingers are made from a single crystal blade alloy having a softer crystallographic direction and a harder crystallographic direction.

21. The seal of claim 20, wherein an axis disposed through the length of the one or more flexible fingers is parallel to the softer crystallographic direction of the blade alloy.

22. The seal of claim 20, wherein the single crystal blade alloy fingers are supported within slots disposed in said base.

23. The seal of claim 22, wherein the base is a holding ring made of wrought superalloys.

24. The seal of claim 18, wherein the plurality of flexible members comprises a hollow tube with inclined slots.

25. The seal of claim 18, wherein the outer sealing surface of the jacket is continuous.

26. The seal of claim 18, wherein the spring rate of the jacket is at least about 50% less than the spring rate of the spring so as to facilitate movement of the jacket by the spring.

27. The seal of claim 18, wherein the one or more flexible fingers comprise a plurality of flexible fingers, each of the plurality of flexible fingers include a generally planar top section, and wherein top sections of adjacent flexible fingers are spaced from each other so as to form a gap therebetween.

28. The seal of claim 18, wherein the cast blade alloy comprises a boundary-free grain structure, the boundary-free grain structure effective to cause the flexible members of the spring member to resist stress relaxation when the spring member is exposed to a temperature greater than about 1300° F.

29. The seal of claim 18, wherein the spring member is disposed within a cavity defined by the jacket, the spring member defining a height of about 0.25 inches.

30. The seal of claim 29, wherein the one or more flexible members defines a thickness of about 0.04 inches.

* * * * *